UNITED STATES PATENT OFFICE.

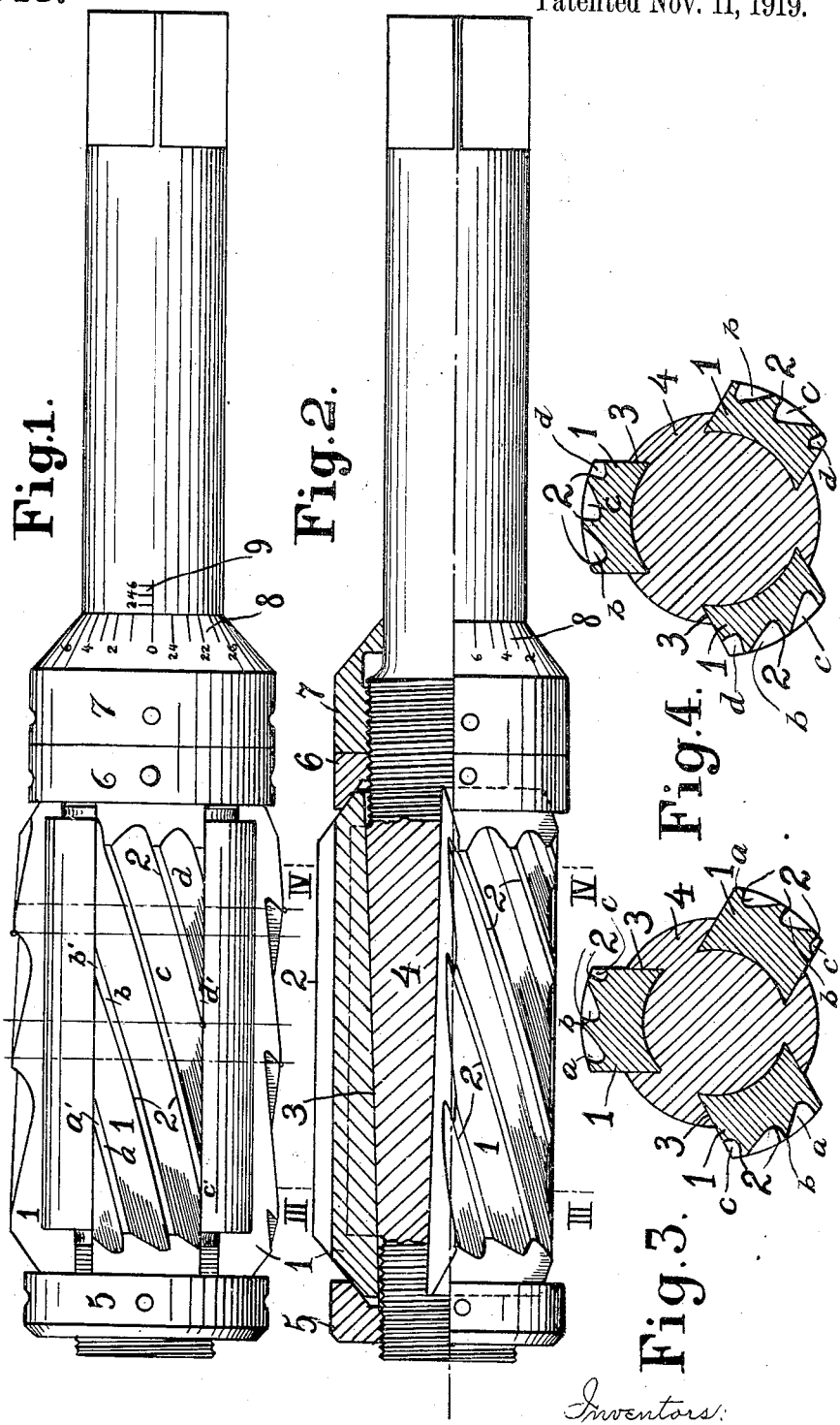

FINN PETTERSEN AND OSKAR JOHANSEN, OF CHRISTIANIA, NORWAY, ASSIGNORS TO BRÖDRENE SUNDT VERKTOIMASKINFABRIK A/S., OF CHRISTIANIA, NORWAY.

ADJUSTABLE REAMER.

1,321,243.　　　　　Specification of Letters Patent.　　Patented Nov. 11, 1919.

Application filed June 6, 1918. Serial No. 238,565.

*To all whom it may concern:*

Be it known that we, FINN PETTERSEN and OSKAR JOHANSEN, both subjects of the King of Norway, residing at Lakkegaten 55, Christiania, in the Kingdom of Norway, have invented certain new and useful Improvements in Adjustable Reamers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to adjustable reamers of the kind comprising a plurality of slidable teeth, which may be adjusted longitudinally in tapering grooves in order to vary the effective diameter of the reamer.

Adjustable helical flutes are also known, the flutes being out on the outside surface of a slotted cylinder mounted on a tapering spindle which is axially adjustable. Reamers of this kind are however difficult to manufacture, and further they are very likely to be damaged when exposed to strenuous work.

The present invention has for its object to provide a reamer having a plurality of independent sections axially adjustable in tapering grooves, each section being formed with a plurality of helical flutes forming teeth or blades having a very large pitch.

As compared with the adjustable helical fluted reamers hitherto known, the present reamer firstly has the advantage, that each tooth may be made of sufficient strength to resist heavy stresses; and secondly, each section may be replaced by a new section when worn out or in any way damaged. Further the flutes of the several sections according to the present invention may be arranged on different sets of helical lines, so that the effective circular pitch of the complete reamer will be only a fraction of the circular pitch of the flutes of each section.

As the accuracy of the reamer is to a large extent dependable on the circular pitch of the flutes, it will be understood, that this arrangement is an improvement on known reamers.

In order to make the working of the reamer as uniform as possible, the several sections according to the present invention are further so formed, that the points of intersection of each flute or blade edge on one side face of a reamer section are set off axially to the corresponding points of section on the opposite side face of the next sections as well as to the points of section on the opposite side face of the same sections. In other words the flutes end at one side of a section in transverse planes that are different from the transverse planes through the ends of the flutes on the opposite side of the same section, said transverse planes being different from the transverse planes through the ends of the flutes of an adjacent tooth.

A form of the invention is shown on the drawing.

Figure 1 is a side view of a reamer. Fig. 2 is a partial sectional view of the same reamer, and Figs. 3 and 4 show cross sections on the lines III—III and IV—IV of Fig. 2 respectively.

The sections 1 are provided at their cylindrical surface with helical flutes 2 and are adjustable longitudinally in grooves 3 in the spindle 4. These grooves are provided in the usual manner with tapering or conical bottoms, and the sections 1 are maintained in their position in the grooves by means of flanged nuts 5, 6 and checknut 7, the nuts 5, 6 gripping in the ordinary way the conical end faces of the sections 1.

Fig. 1 illustrates how the ends of the flutes terminate or intersect the side faces of the sections, the places of termination and intersection being in different transverse planes.

In said Fig. 1, it will be seen that the flute $a$ terminates in the side of the section at $a'$ and that the flute $b$ terminates at $b'$ in the same side.

According to applicant's invention, the corresponding flutes $a$ and $b$ of the adjacent sections will terminate in different transverse plane as indicated in dotted lines.

The flutes $c$ and $d$ intersect the opposite side of said tooth at $c'$, $d'$, respectively, the points of intersection being in different transverse planes than the planes of termination of the flutes $a$, $b$, and in different transverse planes than the points of intersection of the corresponding flutes *c* and *d* of the adjacent teeth.

Further as will be seen on Fig. 1 the reamer according to the present invention is provided with a micrometric adjusting device, the nut 7 being provided with a scale 8 which in combination with scale 9 on the spindle indicates in hundredths of millimeters the diameter for which the reamer is adjusted.

Claims:

1. An adjustable reamer comprising a plurality of axially adjustable toothed sections slidable in tapering grooves in the reamer spindle, each of said sections being provided with a plurality of helical teeth, the ends of the teeth of a section terminating in the sides thereof in different transverse planes.

2. An adjustable reamer comprising a plurality of axially adjustable toothed sections slidable in tapering grooves in the reamer spindle, each of said sections being provided with a plurality of helical flutes forming teeth or blades, the ends of the teeth of a section terminating in the sides thereof in different transverse planes, and also in planes different from the planes in which the teeth of an adjacent section terminate.

3. An adjustable reamer comprising a plurality of axially adjustable toothed sections slidable in tapering grooves in the reamer spindle each of said sections having a plurality of teeth terminating at the sides of the sections, the ends of all the teeth at the sides of all the sections terminating in different transverse planes.

4. A reamer comprising a plurality of toothed sections spaced apart around the periphery of the reamer spindle, each section having a plurality of helical teeth, the ends of all the teeth at the sides of all the sections terminating in different transverse planes.

In testimony that we claim the foregoing as our invention, we have signed our names in presence of two subscribing witnesses.

FINN PETTERSEN.
OSKAR JOHANSEN.

Witnesses:
C. VARMAN,
M. W. RAHRS.